(12) United States Patent  
Majors (10) Patent No.: US 12,212,789 B2  
(45) Date of Patent: Jan. 28, 2025

(54) UNIQUE REMOTE EXPERIENCE OF LIVE EVENT

(71) Applicant: DISH Network L.L.C., Englewood, CO (US)

(72) Inventor: Ryan Majors, Westminster, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

(21) Appl. No.: 18/135,292

(22) Filed: Apr. 17, 2023

(65) Prior Publication Data

US 2024/0348840 A1 Oct. 17, 2024

(51) Int. Cl.
*H04N 21/80* (2011.01)
*H04N 21/218* (2011.01)
*H04N 21/23* (2011.01)
*H04N 21/239* (2011.01)
*H04N 21/2668* (2011.01)

(52) U.S. Cl.
CPC ... *H04N 21/21805* (2013.01); *H04N 21/2393* (2013.01); *H04N 21/2668* (2013.01)

(58) Field of Classification Search
CPC ......... H04N 21/21805; H04N 21/2393; H04N 21/2668; H04N 21/4728; H04N 21/2187; H04N 23/695; H04N 23/661
See application file for complete search history.

(56) References Cited

U.S. PATENT DOCUMENTS

| | | | |
|---|---|---|---|
| 2006/0170778 A1* | 8/2006 | Ely | H04N 21/25875 725/148 |
| 2014/0152834 A1* | 6/2014 | Kosseifi | H04N 7/181 348/158 |
| 2015/0304724 A1* | 10/2015 | Prosserman | H04N 21/44008 725/37 |
| 2019/0082233 A1* | 3/2019 | Love | H04N 21/21805 |
| 2019/0109975 A1* | 4/2019 | Linderoth | H04N 23/661 |
| 2022/0004254 A1* | 1/2022 | Roberts | H04N 21/234363 |
| 2022/0303592 A1* | 9/2022 | Tamjid | H04N 21/25841 |
| 2022/0368956 A1* | 11/2022 | Resnick | H04N 21/2143 |

* cited by examiner

*Primary Examiner* — Alazar Tilahun
(74) *Attorney, Agent, or Firm* — Wash Park IP Ltd.; John T Kennedy (57) ABSTRACT

A method for providing a unique remote experience of a live event includes receiving in near real time at a headend processing system from a control center at an event location raw media data captured at a live event occurring at the event location. Copies of the raw media data from the headend processing system are disseminated in near real time to a plurality of server nodes of a geographically distributed content delivery network connected together via communication network. The raw media data is processed to produce one or more customized presentations of the live event in the form of streaming audio/video (A/V) files of one or more subsets of the raw media data pursuant to one or more data structures corresponding, respectively, to one or more subscriber accounts. The streaming A/V files are transmitted over a communication network to one or more respective subscriber presentation devices.

20 Claims, 5 Drawing Sheets

UNIQUE REMOTE EXPERIENCE OF LIVE EVENT

TECHNICAL FIELD

The subject matter described herein relates to devices, systems, and methods for providing a unique remote experience of a live event via transmission over a content delivery network.

BACKGROUND

Live events with ticketed entries, for example, professional or college football, basketball, or baseball games, or other athletic events, popular music concerts, "Broadway" musicals, operas, and other live events have limited seating capacity and demand for a performance may outstrip supply of tickets. Ticket resale markets for limited seats may drive the price of tickets to levels that are unaffordable for many potentially interested parties. For some people, even the face value cost of a ticket to a live event is beyond their budget. In some situations, an interested event consumer may live in a location far away from the event, which makes attending the event logistically difficult or overly expensive.

In some instances, live events are filmed for live or delayed broadcast to viewers at home on television, e.g., through broadcast television, cable or satellite television subscription services, or streaming services over the internet. In some circumstances, the broadcasts may be promoted as premium event requiring an additional subscription and fee to receive access credentials to a designated channel on which the live event is broadcast. (Boxing bouts are typical of such premium live programming.) Such broadcasts are produced, with camera positions and angles, cuts between cameras, content displayed, live sound, and additional commentary selected and edited for presentation by the production staff of the network that secured the rights to such a broadcast. The viewer at home has no ability to influence or select the images or sound presented in the broadcast of such a live event.

The information included in this Background section of the specification, including any references cited herein and any description or discussion thereof, is included for technical reference purposes and is not to be regarded subject matter by which the scope of the various implementations described herein or recited in the claims is to be bound.

SUMMARY

In accordance with at least one implementation of the present disclosure a system includes a headend processing system and a geographically distributed content delivery network to provides a unique remote experience of a live event. The headend processing system is configured to receive, in near real time from a control center at an event location, raw media data captured at a live event occurring at the event location and disseminate, in near real time, copies of the raw media data. The geographically distributed content delivery network includes a plurality of server nodes of connected together via a communication network and is configured to receive the copies of the raw media data from the headend processing system; process the raw media data to produce one or more customized presentations of the live event in a form of streaming audio/video (A/V) files of one or more subsets of the raw media data pursuant to one or more data structures corresponding, respectively, to one or more subscriber accounts; and transmit the streaming A/V files over the communication network to one or more respective subscriber presentation devices.

In an alternate implementation of the system, the raw media data received at the headend processing system further includes omnidirectional video data from a first camera at a first camera location at the live event.

In an alternate implementation of the system, one of the server nodes further receives a request over the communication network from one of the subscriber presentation devices to select video data from a second camera at a second location at the live event; and the one of the server nodes is further configured to transmit the video data corresponding to the second camera to the one of the subscriber presentation devices.

In an alternate implementation of the system, one of the server nodes, upon receipt of a request over the communication network from one of the subscriber presentation devices to modify a form of presentation of the omnidirectional video data from the first camera location at the live event, is further configured to modify the form of presentation of the omnidirectional video data pursuant to the request to create a modified streaming A/V file; and transmit the modified streaming A/V file to the one of the subscriber presentation devices.

In an alternate implementation of the system, the server node is further configured to modify the omnidirectional video data by at least one of panning and zooming images within the omnidirectional video data before creating the modified streaming A/V file.

In an alternate implementation of the system, the system further includes a data structure populated with data corresponding to permissions and restrictions respecting control over modification of the omnidirectional video data based upon purchased access rights corresponding to the one of the subscriber presentation devices.

In an alternate implementation of the system, the data structure further includes one or more of the following a network connection profile, a subscription profile, and a real-time control profile.

In an alternate implementation of the system, the subscription profile further includes information governing control of access to video data from one or more camera locations at the live event.

In an alternate implementation of the system, the real-time control profile further includes information governing real-time modification of images within the omnidirectional video data before creating the modified streaming A/V file.

In an alternate implementation of the system, the raw media data received at the headend processing system further includes live sound data from a microphone at a microphone location at the live event.

In accordance with at least one implementation of the present disclosure a method provides a unique remote experience of a live event. In near real time a headend processing system receives from a control center at an event location, raw media data captured at a live event occurring at the event location. In near real time, copies of the raw media data are disseminated from the headend processing system to a plurality of server nodes of a geographically distributed content delivery network connected together via a communication network. The raw media data is processed to produce one or more customized presentations of the live event in a form of streaming audio/video (A/V) files of one or more subsets of the raw media data pursuant to one or more data structures corresponding, respectively, to one or more subscriber accounts. The streaming A/V files are transmitted over the communication network to one or more respective subscriber presentation devices.

In an alternate implementation of the method, the received raw media data includes omnidirectional video data from a first camera at a first location at the live event.

In an alternate implementation of the method, one of the server nodes further receives, over the communication network from one of the subscriber presentation devices, a request to select second video data from a second camera at a second location at the live event. The one of the server nodes further switches the streaming A/V files to the second video data.

In an alternate implementation of the method, one of the server nodes further receives, over the communication network from one of the subscriber presentation devices, a request to modify a form of presentation of the omnidirectional video data from the first camera location at the live event. The server node further modifies a form of presentation of the omnidirectional video data pursuant to the request to create a modified streaming A/V file. The modified streaming A/V file is further transmitted to the one of the subscriber presentation devices.

In an alternate implementation of the method, the server node further modifies the omnidirectional video data by at least one of panning and zooming images within the omnidirectional video data.

In an alternate implementation of the method, a data structure is populated with data corresponding to permissions and restrictions based upon purchased access rights corresponding to the one of the subscriber presentation devices.

In an alternate implementation of the method, the data structure further includes one or more of the following: a network connection profile, a subscription profile, and a real-time control profile.

In an alternate implementation of the method, the subscription profile further includes information governing control of access to video data from one or more camera locations at the live event.

In an alternate implementation of the method, the real-time control profile further includes information governing real-time modification of images within the omnidirectional video data before creating the modified streaming A/V file.

In an alternate implementation of the method, the received raw media data further includes live sound data from a microphone at a microphone location at the live event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the various implementations described herein is provided in the following written description of various implementations and illustrated in the accompanying drawings.

BRIEF DESCRIPTION OF THE DRAWINGS

The disclosure will be readily understood by the following detailed description in conjunction with the accompanying drawings. In some instances, like reference numerals designate like structural elements.

DETAILED DESCRIPTION

As described above, there are many circumstances in which attendance at live events for some people who have an interest in participating is precluded. Barriers to attendance may include limited ticket availability, cost of tickets, inconvenient or inaccessible location, and others. The present disclosure proposes a system to break down these barriers by providing the live experience in the comfort of one's home by providing immersive media transmissions from the remote event to users who subscribe to access to the event as a premium addition to their regular cable television, satellite television, or video streaming service, e.g., as a pay-per-view program. These media transmissions are directly and interactively controllable by the subscriber across a variety of parameters.

Figure 1:
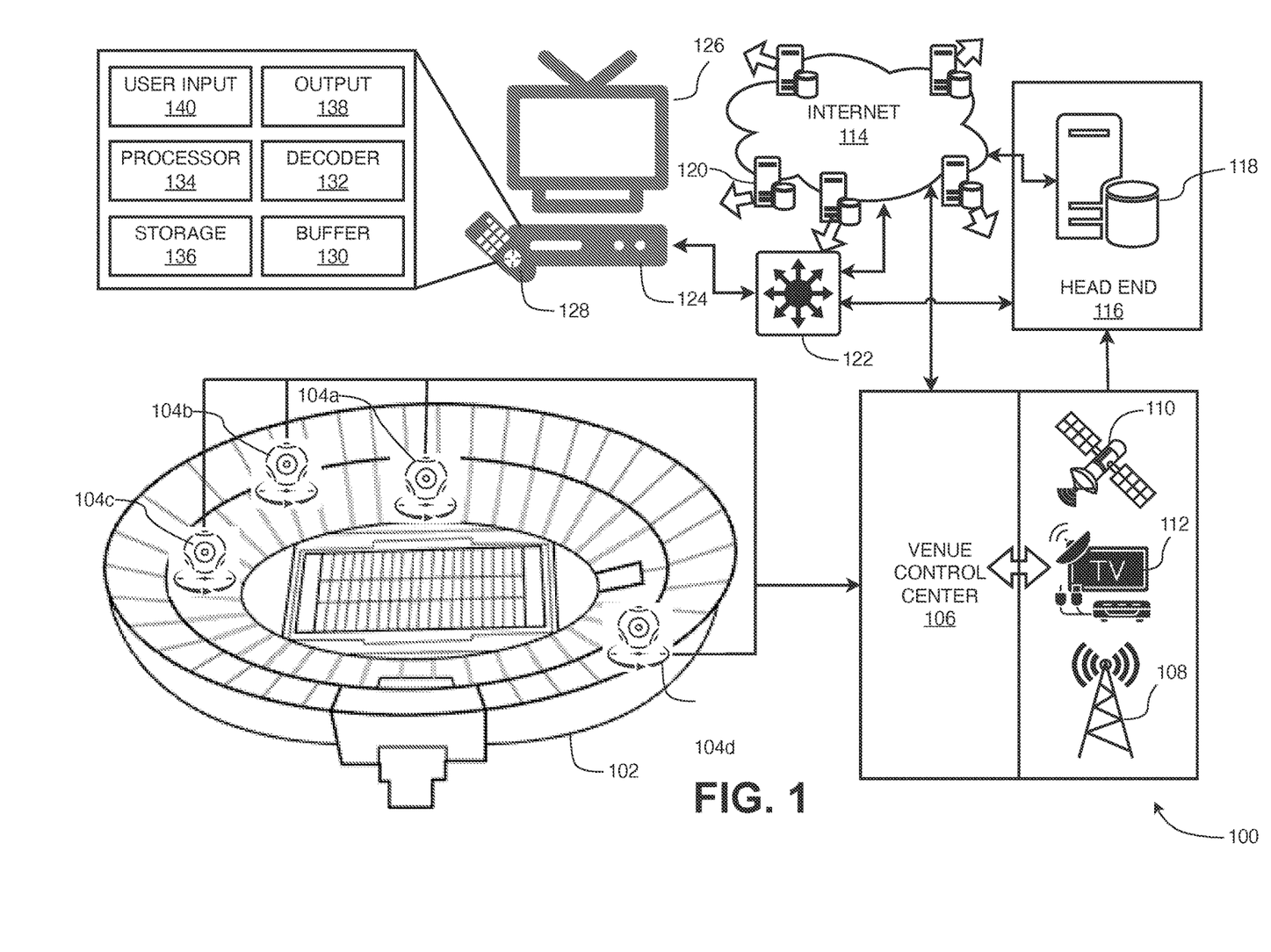
FIG. 1 is a schematic illustration of an implementation of a system for providing a unique remote experience of a live event.

An example of one implementation of such a system 100 is presented in FIG. 1. In this example, a live event, e.g., a football, baseball, basketball, or soccer game, is taking place at an athletic stadium, arena, or other venue 102. Other live programs, for example, music concerts, plays, musicals, operas performed in theaters, arenas, stadiums, and other venues can similarly be provided for subscription broadcast. The proposed implementation leverages the technology of spherical or omnidirectional (360 degree) video cameras, for example, an Insta360 Pro 2-360 VR Camera with 8K resolution, and robust backend media processing to provide a remote subscriber with a rich and immersive experience of the event.

Omnidirectional cameras have a field of view that covers approximately the entire sphere or, more typically, a full circle in the horizontal plane excluding top and bottom directions. Omnidirectional cameras include several wide angle and/or "fishbowl" lenses on multiple sides of the camera to capture images in every direction. The lenses of the omnidirectional camera are actuated simultaneously to capture pictures and video with an angle of just over 180 degrees, e.g., 220 degrees. These image frames are then converted into a 360-degree image object using software implemented on a processor chip to "stitch" the edges together by comparing the pixels in the edge regions of each picture and overlapping the edges in alignment to create a "seamless" image. Many available omnidirectional cameras can provide 4K and 8K resolution and include processing capabilities to internally perform the stitching process, as well as encode, compress, and format the images for distribution. A corresponding microphone collocated at or incorporated with each camera captures the ambient sound at the same location, and the audio data is included in the media data transmitted to the subscriber to enhance the remote viewing experience.

As shown in FIG. 1, multiple omnidirectional cameras 104*a-d* with corresponding microphones may be placed in various locations throughout the venue 102. The placement of the omnidirectional cameras 104a-d may correspond to different tiers of tickets sold to persons physically attending the event at the venue 102. Remote subscribers may similarly be offered remote access to the live event at various pricing tiers corresponding to the physical locations of the cameras placed throughout the venue. For example, a first omnidirectional camera 104a represents a higher priced remote subscription ticket to the event as the images provided to a subscriber will correspond to a seat closest to the primary activity in the venue 102, e.g., the 50-yard line of a football game, center court at a basketball game, or front row, center at a concert or play. A second omnidirectional camera 104b is positioned further from the center of the venue 102 and at a higher vantage point. A subscription to the view of this second omnidirectional camera 104b the live event may be priced lower than the subscription to media stream from the first omnidirectional camera 104a.

Additional cameras may be placed in other locations within the venue 102. For example, a third omnidirectional camera 104c may be located at a far side or end seating section and a subscription to a "seat" at that vantage point may have a lower price than the media streams from the first and second omnidirectional cameras 104a, 104b. As a final example, a fourth omnidirectional camera 104d may be located in a least desirable seating area in the venue 102, e.g., very high or far from the program or event (i.e., "nosebleed" seats) and the media stream from this location may be priced for subscription lower than the media streams from the other camera locations, in the same way that live attendance tickets are sold. The number and placement of cameras in FIG. 1 is merely exemplary. Additional omnidirectional cameras may be located in various other sections of the venue, e.g., in each section, every other section, in an array of sections, or in any other configuration. In another example, at a music festival with different stages, omnidirectional cameras may be located to capture each stage in the venue, for example, positioned at each sound mixing platform.

In this system 100, the subscriptions for remote viewing of the program at the venue 102 are less costly than the corresponding live attendance tickets and provide similar views, sounds, and experience, as if the subscriber were actually attending the event in person. Further, unlike live attendance tickets which are limited in number, there is no limit to how many tickets or subscriptions can be sold for live remote viewing of the event through one or more of the spherical cameras 104a-d.

Use of omnidirectional cameras 104a-d in each of multiple locations provides for a full, immersive view in any direction from the particular vantage point. The encoded, compressed video and audio feeds from each of the omnidirectional cameras 104a-d is received at a venue control center 106 on-site at the venue 102. The venue control center 106 typically provide at least a portion of the production management for a broadcast of the event from the venue 102. For example, if the venue 102 is hosting a professional football game, the venue control center 106 will manage the camera feeds from within the venue 102, switching between views at the direction of a production director, and overlay audio from commentators, to output a broadcast video feed for transmission over a broadcast channel. The broadcast video feed may be carried by one or more transmission systems, for example, a terrestrial antenna 108, a satellite uplink system 110, or a cable television uplink system 112.

The video and audio data from the omnidirectional cameras 104a-d is packaged at the venue control center 106 as raw media data without any editing or production decisions for transmission to a headend 116. The raw media data may also include feeds from the regular broadcast production cameras at the event, as well as the audio channel from commentators (if any), and metadata related to the event used in the broadcast transmission, e.g., the status, time-clock, and scores related to an athletic event at the venue 102. The raw media data may be transmitted to the headend 116 via the satellite uplink system 110 or the cable television uplink system 112 if adequate bandwidth is available. Alternatively, the raw media data may be transmitted via a wireless network, e.g., fixed wireless network or a Fifth Generation (5G) wireless telephony network for connection with a broadband communication network, such as the Internet 114, to the headend 116 where initial processing activities may be performed on the raw media data.

For example, the headend 116 may provide additional compression of the raw media data to accommodate multiple subscriber platforms and bandwidth availability of subscribers. As another example, the headend 116 may process the raw media data for presentation through a virtual reality (VR) platform, e.g., a VR headset used by a subscriber. In addition, the headend 116 may package the raw media data within a custom framework designed for the type of event. For example, for a sporting event, the headend 116 may process the event metadata to provide an available graphic overlay for presentation with the video indicating event information such as play status, timeclock, and scores related to the sporting event.

The minimally processed raw media data may then be transmitted from the headend 116 to a plurality of geographically dispersed CDN server nodes 120 connected via the Internet 114 and forming a content delivery network (CDN). CDN server nodes 120 are usually deployed in multiple locations, often over multiple Internet backbones. Benefits of a CDN include reduced bandwidth costs, improved streaming, reduced page load times, and increased global availability of content. The number of nodes and servers making up a CDN varies, depending on the architecture, some reaching thousands of CDN server nodes 120 with tens of thousands of servers on many remote points of presence.

Requests for content are typically algorithmically directed to CDN server nodes 120 that are optimal in some way with respect to the location of the subscriber. When optimizing for performance, locations that are best for serving content to the subscriber may be chosen. This may be measured by choosing locations with the fewest hops to the subscriber location, the lowest number of network seconds away from the subscriber, or the highest availability in terms of server performance (both current and historical), to optimize delivery across local networks. When optimizing for cost, locations that are the least expensive may be chosen. In an optimal scenario, these two goals tend to align, as CDN server nodes that are close to the subscriber at the edge of the network may have an advantage in performance or cost.

By making multiple copies of the raw media data to populate it within the CDN, the raw media data is located spatially closer to subscribers, thereby reducing latency in provision of the multimedia presentation of the event to a subscriber, particularly when the subscriber makes requests for individualization in the multimedia presentation as described further herein. In addition to merely transmitting the media data from the venue live to a subscriber, the CDN server nodes 120 may be equipped with parallel instances of high speed, high throughput video processors to manipulate the video before final broadcast to the subscriber in response to modification requests from the subscriber as further described below.

When a subscriber selects a live event for transmission and presentation on a subscriber device, the geographically closest CDN server node 120 may transmit a processed subset of the raw media data of the live event to the subscriber as a streaming audio/video (A/V) file over the Internet 114 and ultimately to the subscriber via a wired network (e.g., coaxial cable, fiber optic, or digital subscriber line (DSL) telephony), a wireless network (e.g., a fixed wireless network, a line-of-sight microwave network, a satellite transmission network (e.g., STARLINK), or 5G wireless telephony). The streaming A/V file may be configured by account profile and real-time direction of the subscriber as further described herein. The streaming A/V file may be received by modem and router components managing data traffic on the local area network (LAN) 122 of the subscriber and ultimately transmitted to a set top box 124 connected to a television 126 or other multimedia A/V display device for presentation to the subscriber. The set top box 124 may include a data buffer 130 to ensure seamless presentation of the streaming A/V file and a decoder 132 operating in conjunction with a processor 134 to decode and decompress the streaming A/V file for presentation on the television 126. Once the streaming A/V file is decompressed and decoded, it is transmitted to the television 126 via an output port 136 in a format suitable for presentation on the television 126, e.g., high-definition multimedia interface (HDMI) format. The set top box 124 may further include local storage 138 on which the decoded streaming A/V file of the live event may be stored for repeat future playback if such permission is available to the subscriber.

In other example implementations, the streaming A/V file of the event may be delivered to other devices on the LAN 122, for example, a personal computer, a laptop computer, a tablet computer, a smart phone, gaming console, a virtual reality device, etc. Playback applications on such devices harness the device processors to perform decoding and decompression operations. As such, the CDN server node 120 providing the streaming A/V file to the subscriber location may adjust the type, size, or quality of the streaming A/V file based upon the type of device identified as the playback device in addition to the service bandwidth at the subscriber location.

The subscriber may maintain control over the presentation of the live event, for example, through a remote-control device 128 interacting with the user input interface 140 of the set top box 124 to control the playback of the streaming A/V file. In some example implementations, if the streaming A/V file is being presented on one of the other devices on the LAN 122 as described above, such subscriber control of the presentation may be exercised through an interface of the playback application on the relevant device.

Figure 2:
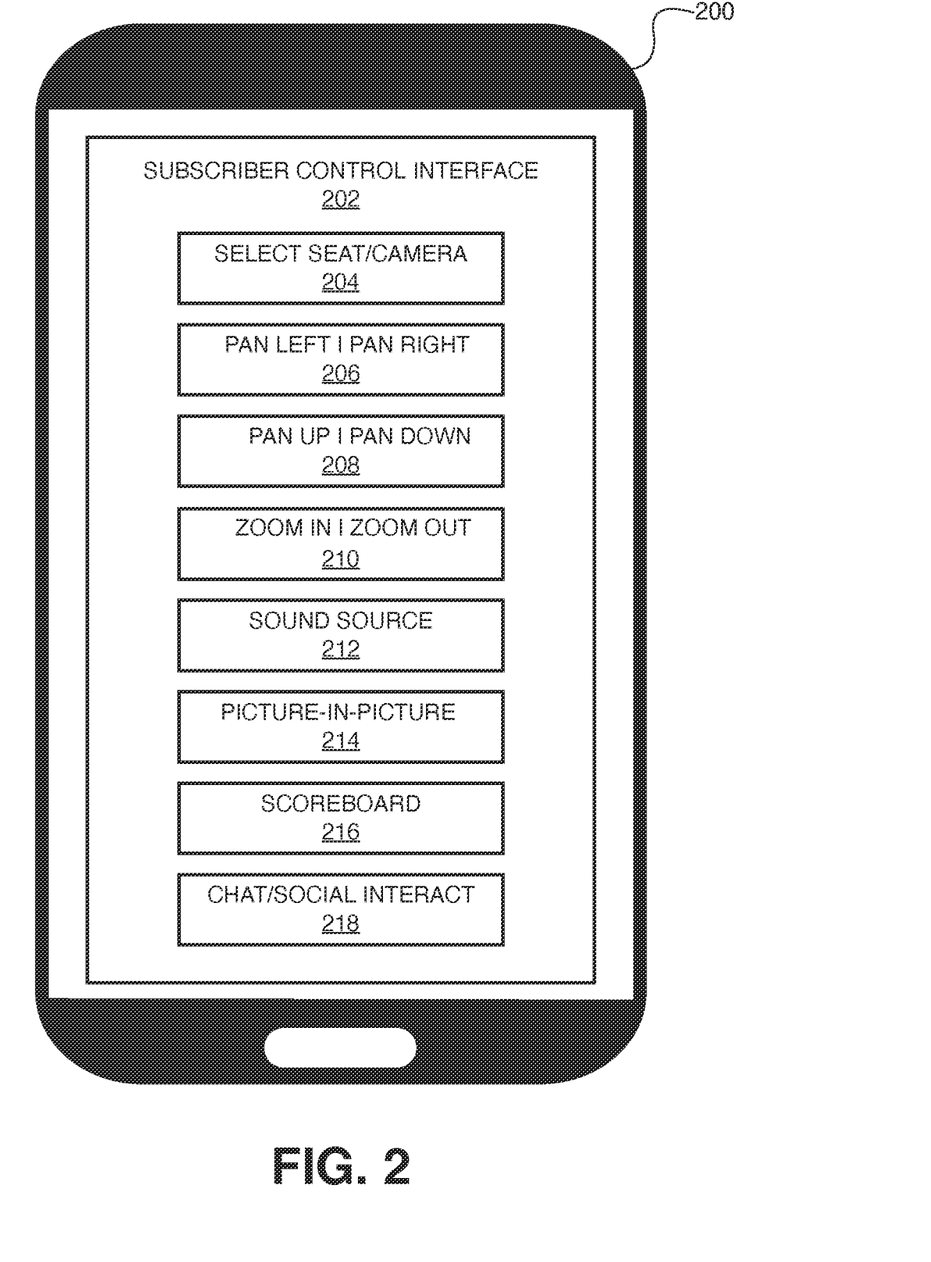
FIG. 2 is a schematic illustration of an implementation of a subscriber control interface for controlling the experience of the live event.

In addition to typical playback control of a streaming A/V file available to a subscriber, e.g., pause, rewind, fast forward, volume control, language selection, closed captioning and subtitle presentation, other control features may be made available to the subscriber specific to the playback of the content from the live event. FIG. 2 depicts some of these additional available controls in the context of a subscriber control graphic user interface (GUI) 202 available on the remote-control device 128, a smartphone device 200 connected to the set top box 124, e.g., via Bluetooth® communication protocol, or through a GUI menu on the television 126 operated by the remote-control device 128. For example, the subscriber may be able to perform a seat or camera selection 204 location in the venue 102 from which the A/V presentation of the event will be provided. The seat/camera selection 204 may be limited to a single, prior selection by the subscriber when initially purchasing access to the event. In other instances, there may be options for a subscriber to purchase a multiple-seat or all-access pass, by which, the subscriber can switch the presentation between several cameras or all available cameras. In some implementations, the subscriber may purchase an ability to switch between the live raw camera footage of the used in the broadcast production of the event, e.g., of a live sporting event, as well as camera feeds from the omnidirectional cameras 104a-d positioned in seats throughout the venue 102. In some example implementations, the seat/camera selection 204 may allow a subscriber to purchase an upgrade to additional seat locations or camera access during the course of the live event.

The subscriber control GUI 202 next indicates an ability for horizontal panning control 206 by the subscriber. Recall that the ticketed cameras in the audience section of the venue 102 are omnidirectional video cameras 104a-d, providing live images 360 degrees around the omnidirectional video cameras 104a-d. The omnidirectional video cameras 104a-d also have a wide vertical field of view which allows for vertical panning control 208. When the subscriber selects either horizontal panning control 206 or vertical panning control 208, the set top box 124 communicates the request to the CDN server node 120 providing the streaming A/V files. The CDN server node 120 then further processes the raw media files to select or focus the presentation formatted for the streaming A/V file to be limited to the chosen direction of the panning request. The processing algorithms at the CDN server node 120 may "move" the image seamlessly in response to the panning request through serial selection of areas of the video frames in the raw media data. By leveraging the data buffer 130 on the set top box 124, the video presented may pan in any direction in response to subscriber input and may be presented seamlessly, i.e., without any hard frame brakes, although a small amount of lag may occur due to the time needed for processing the raw image data at the CDN server node 120.

The subscriber control GUI 202 next indicates an ability for zoom control 210 by the subscriber. Similar to the panning control described earlier, due to the high resolution of the omnidirectional video cameras 104a-d (e.g., 4K to 8K), good quality "magnification" of areas of the video can be output by a processing algorithm at the CDN server node 120 responsive to a zoom control 210 input from the subscriber received over the Internet from the set top box 124. As with panning, the processing algorithms at the CDN server node 120 may zoom in and out of the video frames seamlessly in response to the zoom request through serial selection of areas of the video frames in the raw media data. By leveraging the data buffer 130 on the set top box 124, the video presented may zoom in and out in response to subscriber input and may be presented seamlessly, i.e., without any hard frame brakes, although a small amount of lag may occur due to the time needed for processing the raw image data at the CDN server node 120.

The subscriber control GUI 202 further indicates sound source control 212, which is a feature for selecting between multiple available sound sources. For example, available sound selection may be between microphone input at one of the omnidirectional video cameras 104a-d capturing live sound and crowd noise at the ticketed seat, mixing board sound, for example, at a music concert, and production sound, e.g., from commentators in a production booth at a live sporting event. One or more of these sound selection options may be available in the raw media data for presentation to an individual subscriber by the CDN server node 120.

Additional functionality in example implementations of the subscriber control GUI 202 may include a picture-in-picture option 214 through which the subscriber may be allowed to present different camera views from the event in windows of the same presentation screen. The CDN server node 120 could be directed by such a subscriber selection to construct a streaming A/V file with two (or more) video streams from the raw media data superimposed over each other. The subscriber control GUI 202 may also include a scoreboard option 216 in which the CDN server node 120 may be directed to construct a visual data overlay representative of real-time statistics of a live sporting event from metadata in the raw media data. In some implementations, the subscriber may even be able to select desired data for presentation from a number of choices and also the format and location of the scoreboard overlay in the streaming A/V file.

A further functional option represented in the subscriber control GUI 202 is a chat or social interaction feature 218. Such a feature might enable an onscreen chat feature through which a subscriber may communication and interact with other subscribers virtually attending the same live event. Such a feature may be handled locally by the set top box 124 communicating with other subscriber set top boxes, either via the Internet 114 or over the closed cable television or satellite television network. Connection to or through other social media platforms for communication options between subscribers is also contemplated.

Figure 3:
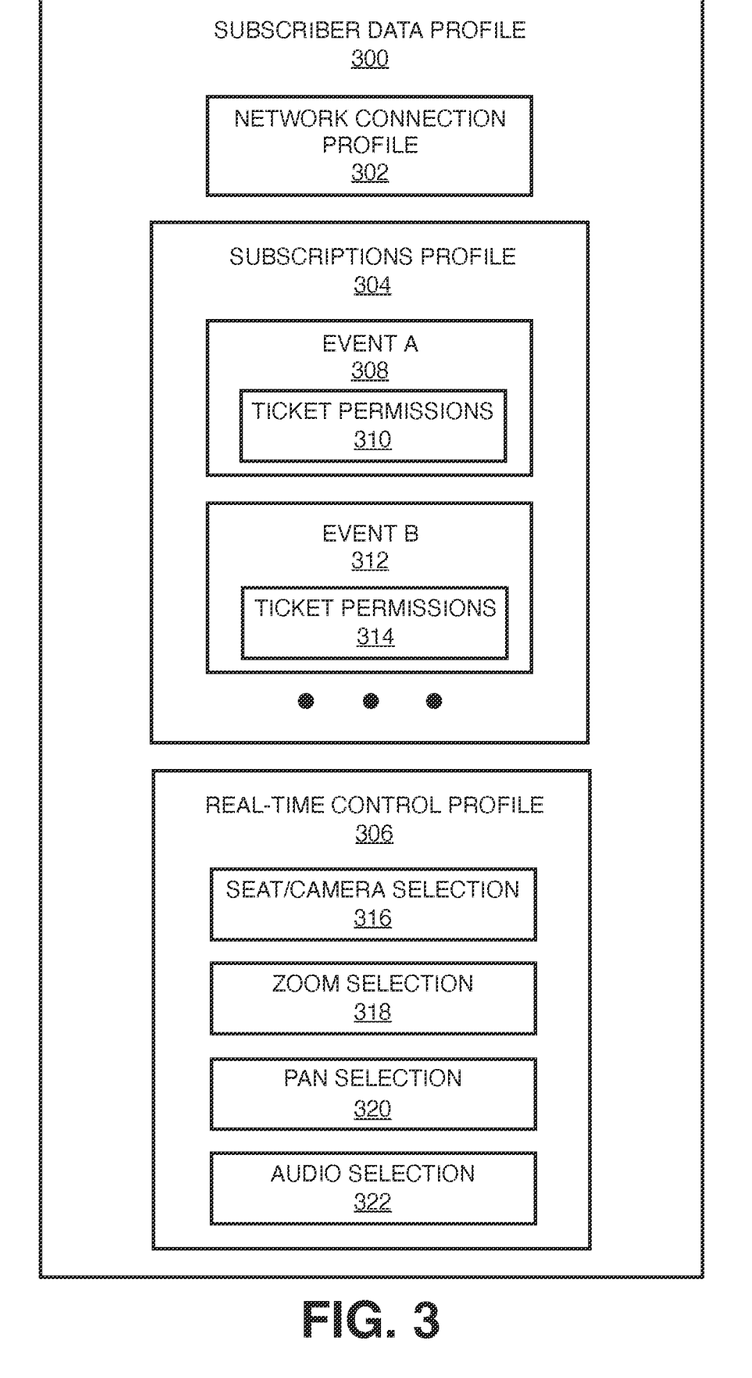
FIG. 3 is a schematic illustration of an implementation of data structure corresponding to a subscriber profile and real time control requests.

The ability to make such selections as indicated in the subscriber control GUI 202 of FIG. 2 may be based upon a subscriber profile 300 as represented in FIG. 3, e.g., whether the "ticket" purchased by the subscriber for the "seat" at the live event includes such additional functionality. For example, a base "ticket" for remote access to the live event may include the video images from the sole omnidirectional video camera 104a-d at the purchased seat location and ambient sound from the microphone at that location, while additional features such as other sound sources, camera feeds, or other controls could be offered to and purchased by the subscriber as premium options and added as permissions to the subscriber profile 300 for the live event, or even to a "season subscription" to a series of related events.

An example implementation of a data structure for such a subscriber profile 300 may include a network connection profile 302, a subscription profile 304, and a real-time control profile 306. The network connection profile 302 may log information about the communication network established with or available to the subscriber. Such information may include maximum and minimum data speeds and bandwidth, effects of time of day on speed and bandwidth, LAN speed and bandwidth, and type of user device. This information may be used to inform the CDN server about the best level of media quality to package from the raw media data to send to the subscriber to ensure a quality and seamless presentation experience for the live event.

The subscription profile 304 may catalog the live event "tickets" the subscriber has purchased. For example, as shown in FIG. 3, the subscribers has purchased tickets to Event A 308 and Event B 312. The ticket permissions 310 and 314 both available for and actually purchased for each of Event A 308 and Event B 312 may differ from each other. For example, Event A 308 may be a sporting event and therefore offer additional options for ticket permissions 310 such as announcer commentary, end zone and flyover camera, and scoreboard information that would not be applicable to Event B 312, which is a rock concert. Event B 312 may offer ticket permissions 314 such as audio from the soundboard mix unavailable from Event A 308. Similarly, the subscriber may have purchased tickets at different premium levels for each of Event A 308 and Event B 312. For example, the subscriber may choose access to a single, upper-level seat for the sporting event, but wants access to the scoreboard, but choose to purchase a ticket upgrade for front row seats to the concert and the soundboard mix. Thus, the ticket permissions 310 and 314 may differ substantially from each other for each live event remote ticket purchased.

Another example portion of the subscriber profile 300 is the real-time control profile 306. The real-time control profile 306 may include certain options as default and track other options as set for the live event by the subscriber in real-time. One example option may be seat/camera selection 316, which may default to the actual virtual seat location purchased, but can be changed by the subscriber to other seats or cameras during the event broadcast and these changes are recorded in the subscriber profile 300 to ensure that the desired view is being accessed for presentation from the raw media data. Other example options may be zoom selection 318 and pan selection 320 based upon the subscriber input through remote control at the set top box. In some implementations, these selections may return to default camera angles or magnification after a predetermined period of time or upon the occurrence of a trigger, for example, play in a sporting event has moved to another location on the field away from the location of the pan selection. By periodically returning to default positions at appropriate times, processing power at the CDN server node may be decreased periodically to manage other tasks. As indicated in FIG. 3, audio selection 322, e.g., between ambient noise at the seat location or a sound board mix, is also an important field in the subscriber profile 300 to ensure that the desired audio is being accessed for presentation from the raw media data.

Figure 4:
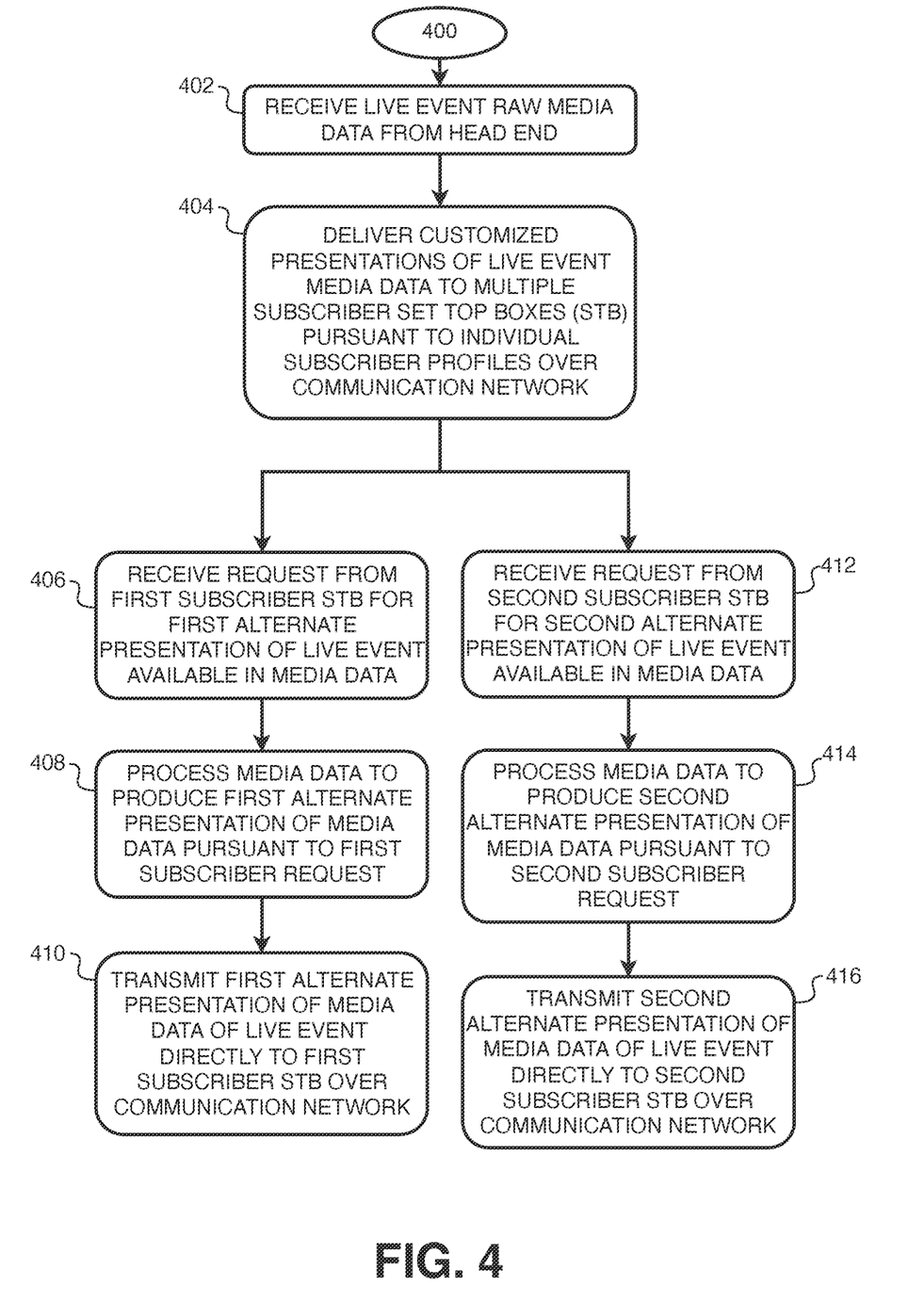
FIG. 4 is a flow diagram of a process undertaken in a content delivery system for providing a unique remote experience of a live event.

FIG. 4 depicts an example process 400 for management and distribution of raw media data at a CDN server node. In a first operation 402, the CDN server node receives raw media data of the live event from the headend. As noted above, the headend may perform some preprocessing and packaging of the raw media data, but the headend is primarily a distribution hub for populating the CDN. Next, in a second operation 404, the CDN server node delivers customized presentations of live event media data in the form of streaming A/V content files over a communication network such as the Internet to multiple subscriber set top boxes pursuant to individual subscriber profiles that are specific to the live event.

The remaining steps for preparation and delivery of the live subscription content to a first subscriber is depicted, for example, in the left-side path of the process 400 in FIG. 4. In receiving operation 406, the CDN server node receives a request from the first subscriber set top box for a first alternate presentation of a live event available in raw media data received by the CDN server node from the headend. As described above, the request for an alternate presentation could be a request to pan the view in a certain direction, to zoom in or out, to change the audio channel, or any other request that would alter the presentation for the first individual subscriber. Next, in processing operation 408, the CDN server node processes the raw media data to produce a first alternate presentation of media data, e.g., in a first streaming A/V file, pursuant to the first subscriber request.

Then, in transmitting operation 410, the CDN server node, transmits the first alternate presentation of the media data of the live event, i.e., by transmitting the first streaming A/V file, directly to the first subscriber set top box over the communication network.

The right-side path of the process 400 in FIG. 4 depicts steps for preparation and delivery of the live subscription content. In receiving operation 412, the CDN server node receives a request from the second subscriber set top box for a second alternate presentation of a live event available in the raw media data received by the CDN server node from the headend. The delivery of the live event content to the second subscriber occurs simultaneously with the delivery of the live event content to the first subscriber. As described above, the request for an alternate presentation could be a request to pan the view in a certain direction, to zoom in or out, to change the audio channel, or any other request that would alter the presentation for the second individual subscriber. The request from the second subscriber may be, and likely is, different than the request from the first subscriber. Next, in processing operation 414, the CDN server node processes the raw media data to produce a second alternate presentation of media data, e.g., in a second streaming A/V file, pursuant to the second subscriber request. Notably, the streaming A/V file prepared for the second subscriber will differ from the streaming A/V file prepared for the first subscriber. Then, in transmitting operation 416, the CDN server node, transmits the second alternate presentation of the media data of the live event, i.e., by transmitting the second streaming A/V file, directly to the second subscriber set top box over the communication network.

Figure 5:
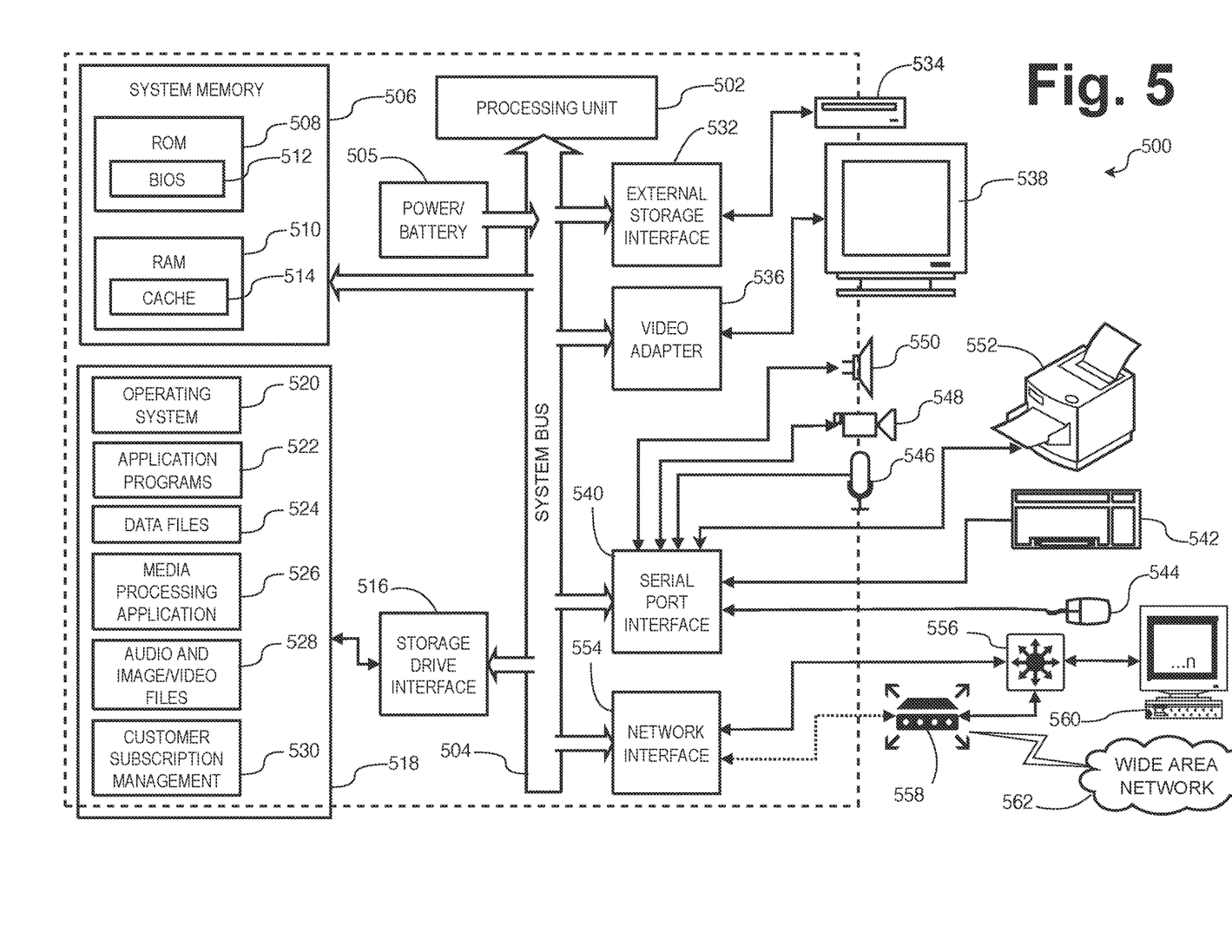
FIG. 5 is a schematic diagram of an example computer system capable of implementing the processes for providing the unique remote experience of a live event.

An exemplary computer system 500 implementing the processes performed as part of the headend or content delivery network for distribution of the live event media to a subscriber as described above is depicted in FIG. 5. The computer system 500, for example, may be in the form of any of a server computer, a virtual machine instantiated on a server, a distributed computer, an Internet appliance, or other computer devices, or combinations thereof, for example, in the form of a content distribution network of computer servers as described herein. Alternatively, the computer system 500 may also be understood as including the basic components of a special purpose computer device (e.g., a set-top cable or satellite television receiver box used by the subscriber), or it may be one or more of a personal computer (PC), a workstation, a notebook or portable computer, or other computing device, with internal processing and memory components as well as interface components for connection with external input, output, storage, network, and other types of peripheral devices, particularly configured to perform the functions described herein. Internal components of the computer system 500 in FIG. 5 are shown within the dashed line and external components are shown outside of the dashed line. Components that may be internal or external are shown straddling the dashed line.

In any implementation described herein, the computer system 500 includes a processor 502 and a system memory 506 connected by a system bus 504 that also operatively couples various system components. There may be one or more processors 502, e.g., a single central processing unit (CPU), or a plurality of processing units, commonly referred to as a parallel processing environment (for example, a dual-core, quad-core, or other multi-core processing device). The system bus 504 may be any of several types of bus structures including a memory bus or memory controller, a peripheral bus, a switched fabric, point-to-point connection, and a local bus using any of a variety of bus architectures.

The computer system 500 may include a power source 505, e.g., either or both an electrical port for connecting to a AC/DC inverter for constant power or a battery for working without a connected power source or for provision of backup power in a case of general or local power outage or emergency.

The system memory 506 includes read only memory (ROM) 508 and random access memory (RAM) 510. A basic input/output system (BIOS) 512, containing the basic routines that help to transfer information between elements within the computer system 500, such as during start up, is stored in ROM 508. A cache 514 may be set aside in RAM 510 to provide a high-speed memory store for frequently accessed data.

A storage drive interface 516 may be connected with the system bus 504 to provide read and write access to a data storage drive 518, e.g., a magnetic hard disk drive or a solid-state drive for nonvolatile storage of applications, files, and data. A number of program modules and other data may be stored on the data storage drive 518, including an operating system 520, one or more application programs 522, and related data files 524. In particular, a media processing application 526, or algorithms or modules thereof, for implementing video and audio processing of live event media events for presentation to a customer pursuant to the customer subscription and real-time requests may be stored on the data storage drive 518. In addition, audio and image/video files 528 may be stored in the data storage drive 518. Further, a customer subscription and request data structure 530 may be stored in the data storage drive for access by the media processing application 526. Note that the data storage drive 518 may be either an internal component or an external component of the computer system 500 as indicated by the data storage drive 518 straddling the dashed line in FIG. 5.

In some configurations, there may be both an internal and an external storage drive. For example, one or more external storage drives 534 may be connected with the system bus 504 via an external storage interface 532 to provide read and write access to the external storage drive 534 initiated by other components or applications within the computer system 500. In some implementations, external storage drives may also be connected to the system bus 504 via a serial port interface 540 further described below. Exemplary external storage drive 534 may include a magnetic disk drive for reading from or writing to a removable magnetic disk, tape, or other magnetic media, and/or an optical disk drive for reading from or writing to a removable optical disk such as a CD-ROM, a DVD, or other optical media. The external storage drive 534 and any associated removable computer readable media may be used to provide nonvolatile storage of computer readable instructions, data structures, program modules, and other data for the computer system 500.

The computer system 500 may include a display device 538, e.g., a display screen, a monitor, a television, or a projector, or other type of presentation device connected to the system bus 504 via an interface, such as a video adapter 536 or a video card. The computer system 500 may also include other peripheral input and output devices, which are often connected to the processor 502 and system memory 506 through the serial port interface 540 that is coupled to the system bus 504. Input and output devices may also or alternately be connected to the system bus 504 by other interfaces, for example, a universal serial bus (USB), an IEEE 1394 interface ("Firewire"), a parallel port, or a game port, or wirelessly e.g., using a Bluetooth® connection interfacing with the serial port interface 540 or system bus 504. A user may enter commands and information into the computer system 500 through various input devices including, for example, a keyboard 542 and pointing device 544, for example, a computer mouse. Other input devices may include, for example, a microphone 546 and a digital video camera 548, or (not shown) a digital camera, a joystick, a game pad, a tablet, a touch screen device, a satellite dish, a scanner, or a facsimile machine.

Output devices may include one or more loudspeakers 550 for presenting the test questions audibly to a student or display device 538 for presenting instruction to a student. Audio devices, for example, loudspeakers 550 or a microphone 546, may alternatively be connected to the system bus 504 through an audio card or other audio interface (not shown). Other output devices may include, for example, a printer 552, or (not shown) a plotter, a photocopier, a photo printer, a facsimile machine, and a press. In some implementations, several of these input and output devices may be combined into single devices, for example, a printer/scanner/fax/photocopier. It should also be appreciated that other types of computer-readable media and associated drives for storing data, for example, magnetic disks or flash memory drives, may be accessed by the computer system 500 via the serial port interface 540 (e.g., USB) or similar port interface.

The computer system 500 may operate in a networked environment using logical connections through a network interface 554 coupled with the system bus 504 to communicate with one or more remote devices. The logical connections depicted in FIG. 5 include a local area network (LAN) 558 and a wide area network (WAN) 562. Such networking environments are commonplace in home networks, office networks, enterprise wide computer networks, and intranets. These logical connections may be achieved by a network access device 556 coupled to or integral with the computer system 500. As depicted in FIG. 5, the network access device 556 may operate as both a wireless router for directing traffic on the LAN 558 or may connect with a switch or hub (the physical structure of the LAN 558), either wired or wireless, internal or external, to connect with remote devices, e.g., a remote computer 560, similarly connected on the LAN 558. The remote computer 560 may be another personal computer, a server, a client, a peer device, or other common network node, and typically includes many or all of the elements described above relative to the computer system 500.

To connect the computer system 500 with a WAN 562, the network access device typically includes a modem for establishing communications over the WAN 562. In some implementations, the modem for external network connections and the router for local network connections may be separate components. Most often the WAN 562 may be the Internet. In some instances the WAN 562 may be a large private network spread among multiple locations, for example, a content distribution network, a cable television and data distribution network, a fixed wireless network, or a virtual private network (VPN). The modem component of the network access device 556 may be a telephone modem, a high-speed modem (e.g., a digital subscriber line (DSL) modem), a cable modem, or similar type of communications device. The network access device 556 with modem is connected to the system bus 504 via the network interface 554. In alternate implementations the network access device 556 may be connected via the serial port interface 540. It should be appreciated that the network connections shown are exemplary and other means of and communications devices for establishing a network communications link between the computer system 500 and other devices or networks may be used.

The terms "module," "program," and "engine" may be used to describe one or more of a hardware component, a software process, or a combination of both, that implement logical operations and/or algorithms to perform a particular function. It will be understood that different modules, programs, and/or engines refer to discrete components of software code that each may perform independent subroutines, tasks, or calculations by implementing one or more algorithms and together perform the functions of the larger application. Modules, programs, or engines may be called upon instantiated by one or more applications, services, code blocks, objects, libraries, routines, scripts, application program interfaces (API), functions, etc. When incorporating software, the modules, programs, and engines may encompass individual or groups of executable files, data files, libraries, drivers, scripts, database records, etc. The logical operations may be implemented as a sequence of processor implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Furthermore, logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration and the dimensions, positions, order and relative sizes reflected in the drawings attached hereto may vary.

The above specification, examples and data provide a complete description of the structure and use of exemplary implementations as recited in the claims. Although various implementations have been described above with a certain degree of particularity, or with reference to one or more individual implementations, other implementations using different combinations of elements and structures disclosed herein are contemplated, as other iterations can be determined through ordinary skill based upon the teachings of the present disclosure. It is intended that matter contained in the above description and shown in the accompanying drawings shall be interpreted as illustrative of particular implementations and not limiting. Changes in detail or structure may be made without departing from the basic elements recited in the following claims.

What is claimed is:

1. A system, that provides a unique remote experience of a live event, comprising:
a headend processing system configured to:
receive, in near real time from a control center at an event location, a plurality of 360 degree image objects captured by an omnidirectional video camera at a live event occurring at the event location; and
disseminate, in near real time, copies of the plurality of 360 degree image objects; and
a server configured to:
receive the plurality of 360 degree image objects from the headend processing system;
determine a unique vantage point, for the live event, at the event location;
wherein one or more data structures, corresponding to a subscriber account, identify the unique vantage point as being subscribed to by the subscriber account;
extract, from the plurality of 360 degree image objects, a video portion that corresponds to the unique vantage point;
further process the video portion to produce, as a compressed A/V file stream, a presentation of the live event from the unique vantage point; and
transmit the compressed A/V file stream to a subscriber presentation device associated with the subscriber account.

2. The system of claim 1,
wherein the server is further configured to:
receive a user request for a customized perspective of the live event from the unique vantage point; and
wherein the user request includes at least one of a horizontal panning request and a vertical panning request of the video portion; and
wherein the plurality of 360 degree image objects is received at the headend processing system from a first camera at a first camera location at the live event.

3. The system of claim 2,
wherein the server further receives a request over a communication network from the subscriber presentation device to select video data from a second camera at a second location at the live event; and
wherein the server is configured to transmit the video data corresponding to the second camera to the subscriber presentation device.

4. The system of claim 2,
wherein the server is further configured to:
receive a request, from the subscriber presentation device, to modify a form of presentation of the video portion from the first camera location at the live event;
modify, pursuant to the request, the form of presentation of the video portion to generate a modified video portion;
create, from the modified video portion, a modified streaming A/V file; and
transmit the modified streaming A/V file to the subscriber presentation device.

5. The system of claim 4,
wherein the server is further configured to:
modify the plurality of 360 degree image objects by at least one of panning and zooming images within the plurality of 360 degree image objects before producing the compressed A/V file stream.

6. The system of claim 4, further comprising:
a data structure populated with data corresponding to permissions and restrictions respecting control over modification of the plurality of 360 degree image objects based upon purchased access rights corresponding to the subscriber presentation device.

7. The system of claim 6,
wherein the data structure further includes:
a real-time control profile.

8. The system of claim 7,
wherein the data structure includes a subscription profile that includes information governing control of access to video data from one or more camera locations at the live event.

9. The system of claim 7,
wherein the real-time control profile includes information governing real-time modification of images within the plurality of 360 degree image objects before producing the compressed A/V file stream.

10. The system of claim 1,
wherein the headend processing system further receives live sound data from a microphone at a microphone location at the live event.

11. A method for providing a unique remote experience of a live event comprising:
receiving, in near real time at a headend processing system from a control center at an event location, raw media data captured by an omnidirectional video camera, at a live event occurring at the event location;
disseminating, in near real time, copies of the raw media data from the headend processing system to a plurality of server nodes of a geographically distributed content delivery network connected together via a communication network;
processing, by at least one of the plurality of server nodes, the raw media data to determine a unique vantage point, for the live event, at the event location;
wherein one or more data structures, corresponding to a subscriber account, identify the unique vantage point as being subscribed to by the subscriber account;
extract, from the raw media data, one or more video subsets that corresponds to the unique vantage point;
produce one or more compressed and customized presentations of the live event in a form of compressed streaming audio/video (A/V) files from the one or more video subsets pursuant to the one or more data structures; and
transmitting the compressed streaming A/V files over the communication network to one or more respective subscriber presentation devices.

12. The method of claim 11,
wherein the received raw media data includes omnidirectional video data from a first camera at a first location at the live event.

13. The method of claim 12, further comprising:
receiving, by one of the server nodes and over the communication network from one of the subscriber presentation devices, a request to select second video data from a second camera at a second location at the live event; and
switching, by the one of the server nodes, the compressed streaming A/V files to the second video data.

14. The method of claim 12, further comprising:
receiving, by one of the server nodes and over the communication network from one of the subscriber presentation devices, a request to modify a form of presentation of the omnidirectional video data from the first camera location at the live event;

modifying, by the server node, a form of presentation of the omnidirectional video data pursuant to the request to create a modified compressed streaming A/V file; and transmitting the modified compressed streaming A/V file to the one of the subscriber presentation devices.

15. The method of claim 14, further comprising:
second modifying, by the server node, the omnidirectional video data by at least one of panning and zooming images within the omnidirectional video data.

16. The method of claim 14, further comprising:
populating a data structure with data corresponding to permissions and restrictions based upon purchased access rights corresponding to the one of the subscriber presentation devices.

17. The method of claim 14,
wherein the data structure further includes:
a real-time control profile.

18. The method of claim 17,
wherein the data structure includes a subscription profile that includes information governing control of access to video data from one or more camera locations at the live event.

19. The method of claim 17,
wherein the real-time control profile includes information governing real-time modification of images within the omnidirectional video data before creating the modified streaming A/V file.

20. The method of claim 11,
wherein the received raw media data includes live sound data from a microphone at a microphone location at the live event.

* * * * *